United States Patent [19]

Cox et al.

[11] 3,927,948

[45] Dec. 23, 1975

[54] APPARATUS FOR PRODUCING DATA INDICATIVE OF THE GEOMETRIC SHAPE AND ARRANGEMENT OF THE VARIOUS COMPONENTS OF A MODEL

[76] Inventors: Leonard C. Cox, 8907 Bonhomme, Houston, Tex. 77036; Joe B. Wyatt, 6111 Yarwell, Houston, Tex. 77035

[22] Filed: Dec. 3, 1973

[21] Appl. No.: 420,760

Related U.S. Application Data

[63] Continuation of Ser. No. 263,129, June 15, 1972, abandoned.

[52] U.S. Cl. .................. 356/167; 356/5; 356/109; 235/151.1
[51] Int. Cl.² ..................... G01B 11/00; G01B 9/02
[58] Field of Search ......... 235/151.1; 356/106, 109, 356/5, 167

[56] References Cited
UNITED STATES PATENTS

| | | | |
|---|---|---|---|
| 3,409,368 | 11/1968 | Fernandez | 356/5 |
| 3,409,375 | 11/1968 | Hubbard | 356/106 |
| 3,513,444 | 5/1970 | Henderson et al. | 356/157 |
| 3,533,701 | 10/1970 | Hruby et al. | 356/167 |
| 3,716,839 | 2/1973 | Totsuka et al. | 356/167 |

*Primary Examiner*—Alfred E. Smith
*Assistant Examiner*—Conrad J. Clark
*Attorney, Agent, or Firm*—Vinson, Elkins, Searls, Connally & Smith

[57] ABSTRACT

An improved method and apparatus for aiding in designing structures, including constructing a working model roughly representative of the proposed structure; scanning the working model to determine the geometric shapes and arrangements of the various components comprising the working model and converting such information into electrical signals acceptable to a computer; processing the data received from the model scanning operation in accordance with a preselected set of programs to obtain a computer symbolic model of the proposed structure; supplying to the computer to create data bases known data on the characteristics of the various components of the proposed structure and at least a portion of the specifications for the relationship of the components; visually displaying said computer symbolic model; modifying the data comprising said computer symbolic model to obtain a computer facsimile model by at least one of altering the working model, altering the visually displayed computer symbolic model, and processing the data comprising the computer symbolic model with data supplied from the data bases; and outputting the data comprising computer facsimile model in at least one of the formats of: storing the data comprising the facsimile model, visually displaying the data comprising the facsimile model, producing two-dimensional drawings, producing specifications, producing altered data bases, and comparing the computer facsimile model against a standard model.

6 Claims, 11 Drawing Figures

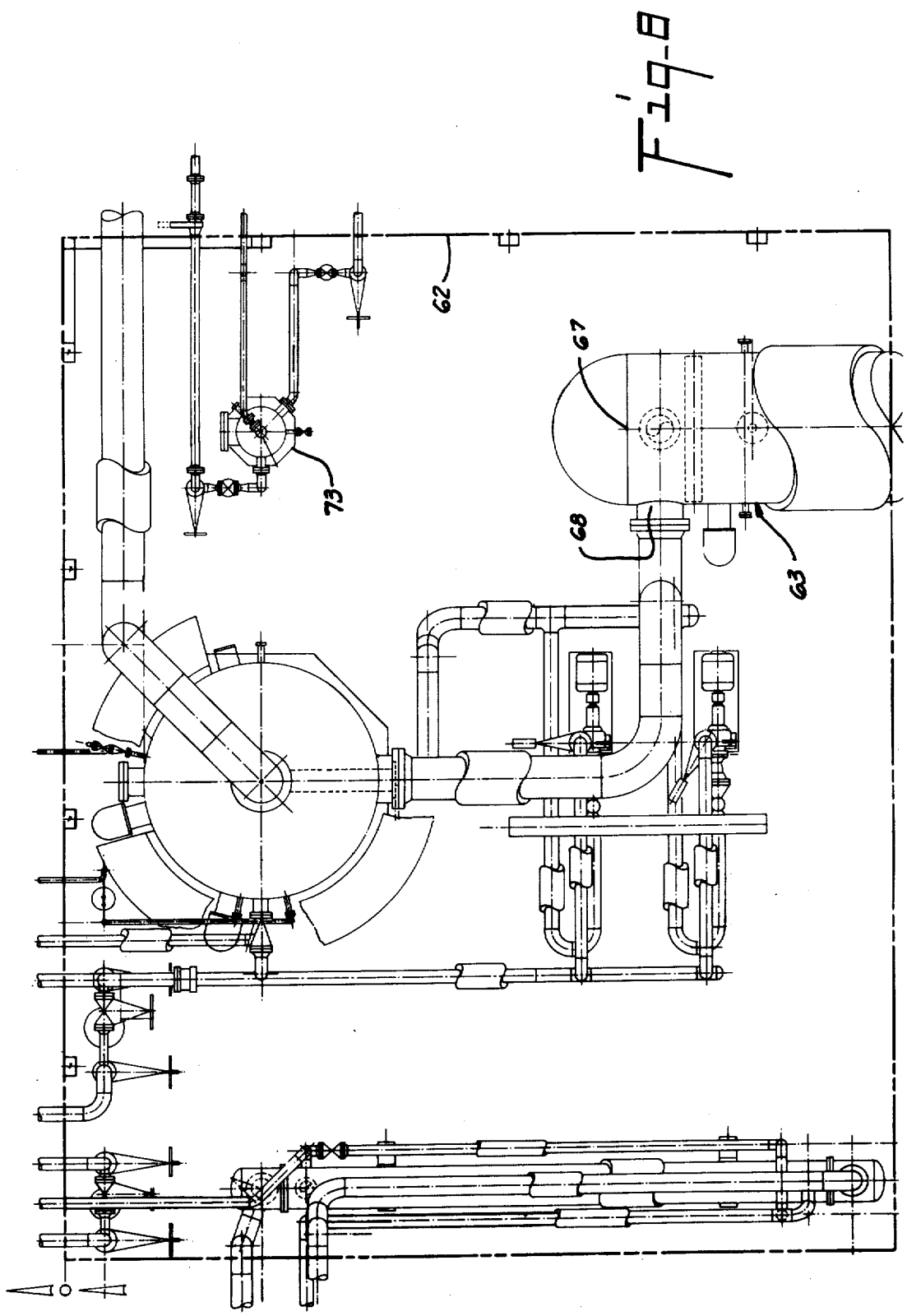

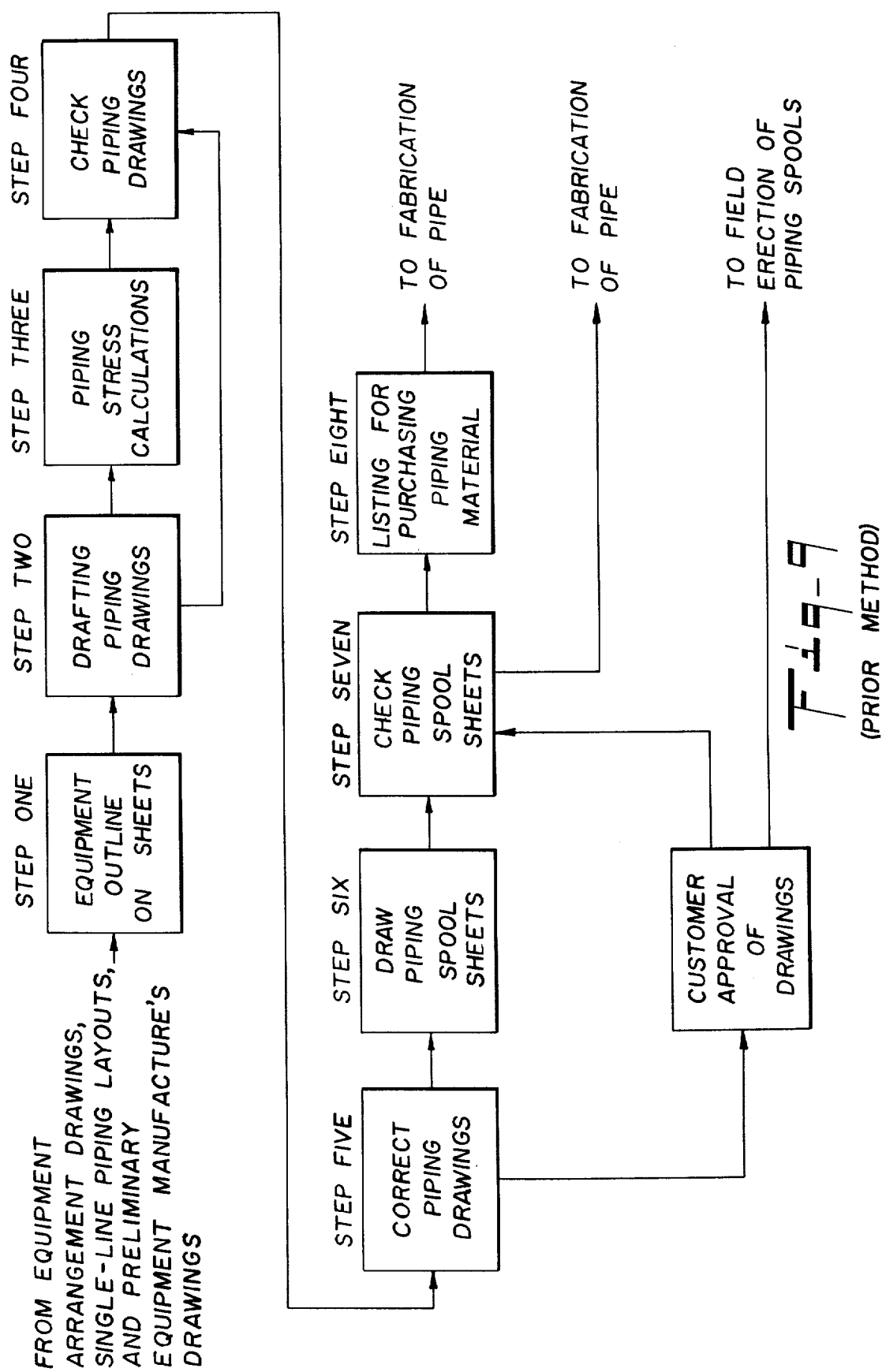

APPARATUS FOR PRODUCING DATA INDICATIVE OF THE GEOMETRIC SHAPE AND ARRANGEMENT OF THE VARIOUS COMPONENTS OF A MODEL

This is a continuation of application Ser. No. 263,129, filed June 15, 1972 now abandoned.

BACKGROUND OF THE INVENTION

This invention relates to a method of and apparatus for designing structures, such as industrial plants. More particularly, this invention is directed toward an improved method and apparatus for producing the two-dimensional drawings, job specifications and data necessary to construct a desired structure from a three-dimensional working model, known data on the various components comprising the structure, and the desired functions and capabilities of the overall structure.

Currently, there are three widely accepted methods of designing industrial plants and presenting the designed data to construction personnel for construction of the plant. In the first method, all stages of the design are accomplished and embodied in two-dimensional drawings. The final design drawings are presented to and used by the construction personnel. The advantages of this method are all engineering data can be easily depicted, multiple copies can be made, and the information is easily transported. The disadvantages of this method are it is difficult to visualize the completed structure, it is difficult to detect errors or conflicts in engineering data, preparation of the drawings is expensive and time consuming, and the drawings often become illegible after numerous changes.

In the second method, all engineering data is prepared and embodied in a three-dimensional model of the structure. The advantages of this method are the completed structure is easily visualized, the project may be rapidly planned, a model is prepared with less expense and faster than numerous two-dimensional drawings, and major errors and conflicts in engineering data are readily apparent. The disadvantages of this method are some types of engineering data cannot be depicted on the model, the model cannot be easily or inexpensively copied, and the model is awkward to handle and is easily damaged.

The third method is a combination of the other two methods. Certain engineering data is first embodied in a working model. This working model and additional engineering data are then utilized to arrive at the final drawings, data and specifications necessary for the construction of the plant. In the case of a chemical processing plant, the working model is usually constructed after the process flow diagrams have been completed, the major equipment components specified, and the equipment layouts or plot plans sketched. The working model usually includes the location and support of major equipment components, access to these components, general routing of major piping, and the general location of instruments and major electrical components. Each component of the working model is constructed from preliminary drawings, catalog information and other data to be as accurate as possible. As the working model develops further, it becomes a major engineering representation of the plant, replacing most rough drawings and sketches. All or portions of the working model are then depicted in two-dimensional design drawings for use by the construction personnel.

The combination of a working model and design drawings possesses a significant advantage over either of the first two methods. This method allows easy visualization of the proposed plant and rapid planning of the project, obviates some of the expense of preparing design drawings, and, once the model is reduced to drawings, still has all of the advantages of the first described method.

This combined method, however, is not without its disadvantages. A tedious, expensive network of activity is necessary to convert the three-dimensional working model, the known specifications and data on the various components comprising the proposed structure, and the desired functions and capabilities of the overall structure into the two-dimensional drawings, job specifications and data which are necessary to the eventual construction of the proposed structure. In an effort to reduce the expensive, time-consuming job of draftsmen converting the three-dimensional working model into two-dimensional drawings, the model is often transferred to the construction location and used there in conjunction with special instruction drawings. This, however, raises the disadvantages of the previously discussed second method. Frequent reference to the model is necessitated. Unless a duplicate model is maintained in the engineering office, engineering assistance concerning changes and revisions is difficult.

This problem has not gone unnoticed, but a satisfactory solution has not been conceived. For instance, in U.S. Pat. No. 2,738,584, an attempt was made to solve the problem by mounting the three-dimensional working model on a grid of squares, photographing the model from a plurality of positions, assembling the photographs on a flat base to form a componsite photograph, and rephotographing the composite to provide the working prints for erecting the plant. There also have been developed apparatus for receiving data in algorithm format and producing two-dimensional drawings therefrom. However, all of the various known apparatus, either singularly or conjunctively, for one reason or another have failed to provide a satisfactory method and apparatus for producing finalized design drawings and specifications for a proposed structure from a three-dimensional working model, known data on the various components comprising the structure, and the desired functions and capabilities of the overall structure.

Additionally, the methods and apparatus known to the art do not provide for effectively and efficiently interrelating known specifications and data on the various components comprising the strucutre with a working model. And, other than physically altering the working model or laboriously redrafting drawings, no method or means is provided for efficiently altering the design of the proposed structure once a working model has been constructed.

This invention provides an improved method and apparatus for designing structures, including: constructing a working model roughly representative of the proposed structure; scanning the working model to determine the geometric shapes and arrangements of the various components comprising the working model and converting such information into electrical signals acceptable to a computer; processing the data received from the model scanning operation in accordance with preselected sets of algorithms to obtain a computer symbolic model of the proposed structure; supplying to the computer to create data bases known data on the characteristics of the various components of the proposed structure and at least a portion of the specifications for the relationship of the components; visually displaying said computer symbolic model; modifying said computer symbolic model to obtain a computer facsimile model by at least one of altering the working model, altering the visually displayed computer symbolic model, and processing the data comprising the computer symbolic model with data supplied from the data bases; and outputting the facsimile model in at least one of the formats of: storing the data comprising the facsimile model, visually displaying the facsimile model, producing two-dimensional drawings, producing specifications, producing altered data bases, and comparing the computer facsimile model against a standard model.

It is an object of this invention, therefore, to provide a new and improved method of and apparatus for designing structures which substantially avoid one or more of the limitations and disadvantages of the design systems heretofore known to the art.

It is an object of this invention to provide an improved method of designing structures wherein a three-dimensional working model of the proposed structure, known specifications and data on the various components of the proposed structure, and the desired functions and capabilities of the overall structure are converted into two-dimensional drawings, job specifications and data on the overall structure.

It is an object of this invention to provide an improved method and apparatus for designing structures wherein a three-dimensional working model of the proposed structure is scanned and converted into electrical signals acceptable to a computer.

It is an object of this invention to provide an improved method and apparatus for designing structures wherein processing the signals representative of a three-dimensional working model of the proposed structure, known specifications and data on the various components of the proposed structure, the desired functions and capabilities of the overall proposed structure in accordance with a preselected set of programs, produces a computer symbolic model of the proposed structure which may be visually displayed and efficiently altered to facilitate designing the finalized structure.

It is an object of this invention to provide an improved method and apparatus for designing structures wherein the three-dimensional working model of the proposed structure is converted into a facsimile model which may be output from the computer in one or more useful formats, including storage, visual display, two-dimensional drawings, specifications, altered data bases, and a form suitable for comparison with a standard model.

BRIEF DESCRIPTION OF THE DRAWINGS

The invention itself both as to organization and method of operation, as well as additional objects and advantages thereof, will become readily apparent from the following description when read in connection with the accompanying drawings in which like numerals represent like parts:

FIG. 8 illustrates typical two-dimensional images produced by data comprising the computer facsimile model according to this invention.

FIG. 9 is a functional representation of the steps involved in designing piping configurations as generally currently practiced in the art.

DESCRIPTION OF THE INVENTION

The improved method and apparatus according to this invention may be utilized to design many varied structures. For purposes of illustrating the preferred embodiment of this invention, however, the method and apparatus will be described with respect to designing a chemical processing plant.

Figure 1:
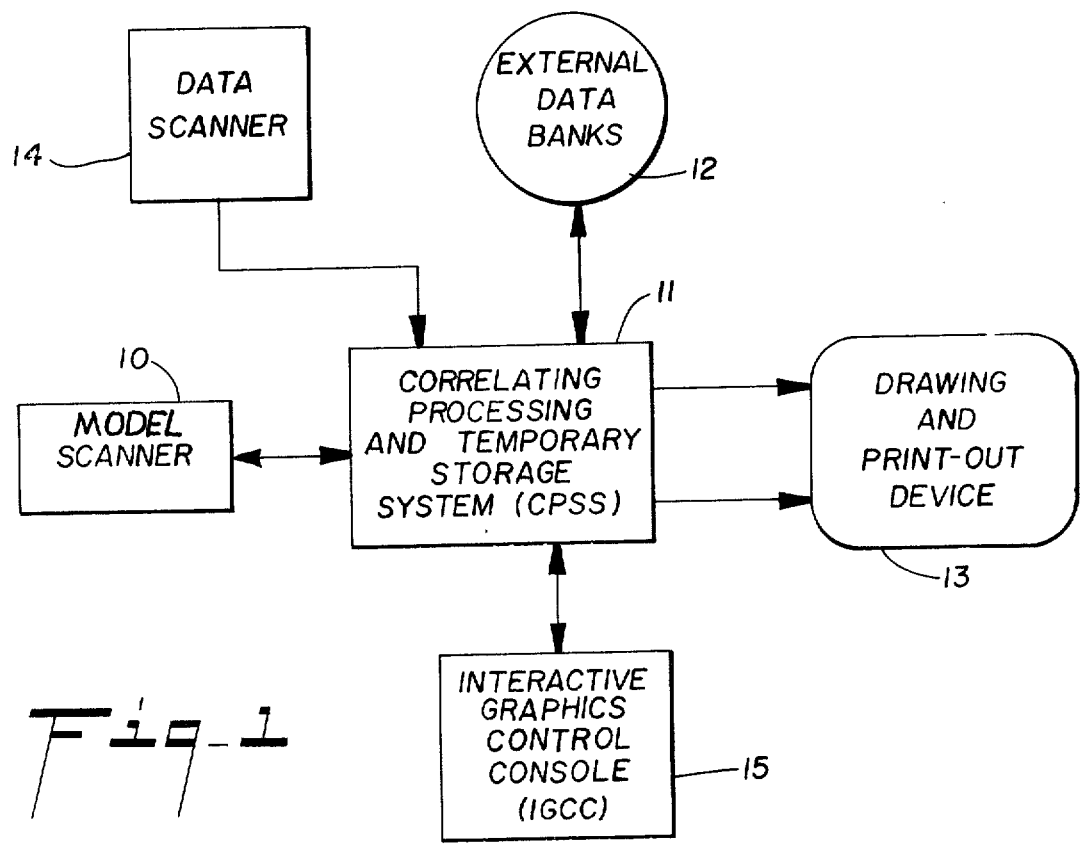
FIG. 1 illustrates in block diagram the preferred apparatus for designing structures according to this invention.

FIG. 1 illustrates in block diagram a preferred embodiment of this invention. Model scanner 10 functions to determine the geometric shapes and arrangements of the various components comprising the working model and to convert such information into representative electrical signals in a format acceptable to the correlating, processing and temporary storage system (CPSS) 11. CPSS 11 functions to receive the data input to it from several sources, to store temporarily such data, correlate and process such data in accordance with preselected sets of programs, and then to output the processed data. Associated with CPSS 11 are certain peripheral devices, including external data banks 12, drawing and print-out unit 13, and data scanner 14. The interactive graphics control console (IGCC) 15 interfaces with CPSS 11 and functions as a communications link between CPSS 11 and the human operator-designer.

Figure 2:
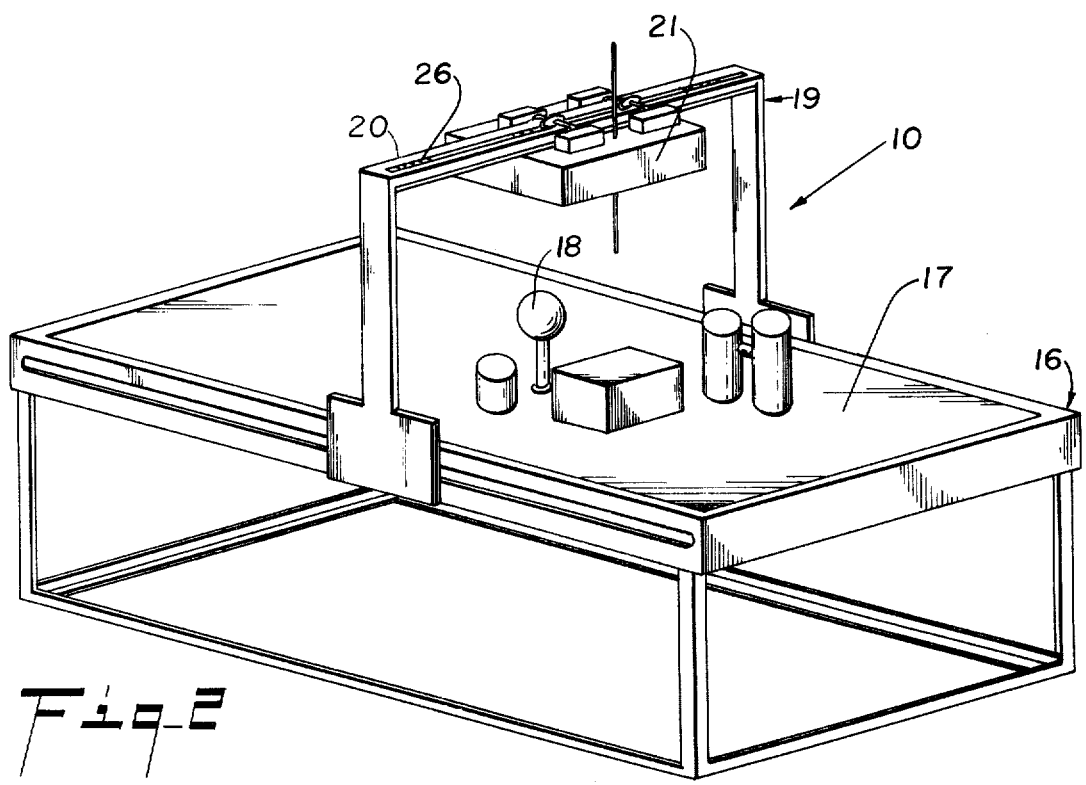
FIG. 2 illustrates isometrically a preferred model scanner according to this invention.

FIG. 2 illustrates isometrically a preferred model scanner 10 according to this invention. A table 16 or other suitable device provides a flat surface 17 for receiving the various components 18 comprising the working model. A working model is a miniature representation of the proposed structure. It need be only roughly to scale. It need not be completely accurate and rarely is operational. The vertical arm of gantry 19 are movably secured to the sides of table 16 so that the gantry may move along the longitudinal length of the table 16 responsive to commands from CPSS 11. The table and gantry preferably are similar to the Model 23 Drafting Table manufactured by The Gerber Scientific Instrument Company, with the vertical arms of the gantry 19 extended upwardly far enough so that horizontal element 20 sufficiently clears the model components located on the surface 17 of the table 16. Movably secured to the horizontal element 20 of gantry 19 is the model scanning unit 21.

Figure 3:
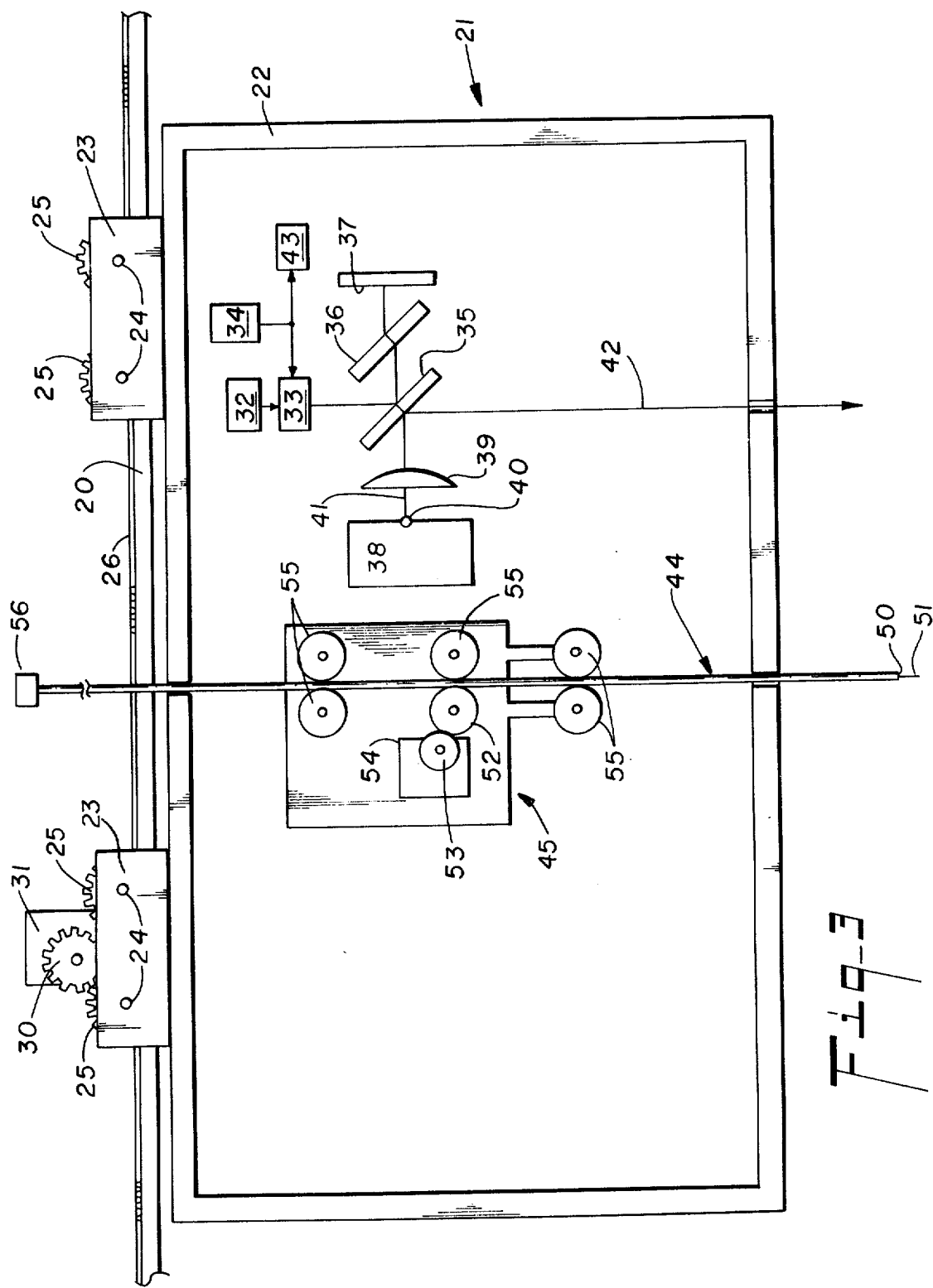
FIG. 3 is a sectional elevation view of a preferred model scanner unit, with the electrical and optical components therein being shown in block diagram.

FIG. 3 illustrates in greater detail the preferred construction of model scanning unit 21. The preferred optical and mechanical apparatus utilized to determine the geometric shapes and arrangement of the components of the model are enclosed within a hollow, rectangular container 22. Container 22 depends from and moves along horizontal element 20 of gantry 19 in any of numerous ways familiar to those skilled in the art. For instance, pairs of flanges 23 may be secured to each end of container 22. Extending between the flanges comprising each pair are two axles 24. Mounted for rotation on each axle is a spur gear 25, each of which is in physical contact with a ratchet-type member 26 attached to the top of horizontal element 20. Mounted in contact with one of the spur gears 25 is a smaller driving gear 30 which may be accurately rotated by a reversible electric motor 31 to move the entire model scanning unit 21 along hotizontal element 20.

Mounted within container 22 is an optical scanning apparatus which preferably is a combination of a coherent light-measuring system of the Twyman-Green version of the Michaelson interferometer and an optical-timing system of the Fizeau variety. Preferably, light from laser source 32 is input into an amplitude modulator 33 driven by a frequency oscillator 34. When the light-measuring system is being utilized, modulator 33 is driven so that its output is of constant amplitude. The light emitted by modulator 33 is collimated and transmitted to a partially reflecting, partially transmitting beam splitter 35. The portion of the light reflected by beam splitter 35 is transmitted through a compensating plate 36 and again reflected by a fixed reference mirror 37. The light reflected from mirror 37 returns to the beam splitter 35 where part of it is transmitted to the observing plane 38. Adjacent the observing plane is located a focusing lens 39 to focus the reflected light onto a photodetector 40. This light beam focused onto the photodetector 40 is referred to as the reference beam 41.

The portion of the light originally tranmitted by the beam splitter 35 is directed to the model to be scanned, where some or all of it is reflected either by the surface of one of the components of the model or the surface of the table. This reflected light is transmitted back to the beam splitter 35, where part of it is reflected to the observing plane 38 and superimposed on the reference beam 41. The portion of the light reflected in this manner is referred to as the signal beam 42.

The compensating plate 36, identical except for a partially reflecting coating and parallel to the beam splitter 35, functions to make the two beams of light emitting from beam splitter 35 perpendicular to the collimated source of light optically identical. The observing plane 38 will be illuminated with a simple, truncated Gaussian spot if the virtual image of the "fixed" mirror 37 is parallel to the "moving" mirror, represented by the surface to be measured, in terms of calculable distance from the source. The focusing lens 39 will give maximum irradiance when constructive interference occurs, indicating the difference in optical path of the two beams of light perpendicular to the collimated source of light is an integral number of wave lengths.

As the signal beam travels across a reflecting surface, deviations in elevations encountered on the reflecting surface cause the Gaussian spot to be traversed by bright and dark fringes—the form of which suffices for counting in ways well known to those skilled in the art. Counting the fringes allows the accurate measurement of deviations in elevation to one half-wavelength of light. Thus, this light measuring system of the scanning unit has particular application where the surface of the model is reflective and a need exists for measuring surface deviations.

As previously mentioned, when the light-measuring system of the scanner unit 21 is utilized, the amplitude modulator 33 is operated to emit a light beam of constant amplitude. However, when the optical-turning system is utilized, amplitude modulator 33 is operated responsive to frequency oscillator 34 so that a coded sequence of light beam pulses is passed through a beam splitter 35 and is transmitted to the working model. A portion of the beam reflected from the surface of the working model is reflected by beam splitter 35 to photodetector 40, which measures its intensity. The frequency oscillator 34 output is also directed to a phase meter 43. The output of photodetector 40 and the output of phase meter 43 are electronically coupled to a logic circuit which by decoding the sequence determines the time delay between the emission of the pulse of light by laser source 32 and the receipt of such pulse of light by photodetector 40 after it has been reflected from the working model. This time delay may be in a manner well known to those skilled in the art to determine the distance from the beam splitter to the surface from which the light was reflected. This optical-timing system of scanning device 21 has particular application where the surfaces of the components are reflective and a need exists for determining the elevation of a point on the reflective surface.

Also mounted within container 22 is a mechanical probe. Preferably the probe 44 is secured in an extending means 45 which functions to move the probe 44 rapidly vertically between a preselected "ready" position and a position in which the lower tip of the probe 44 lightly contacts the surface of a component or of the table. The extending means 45 also functions to determine how far downward the probe 44 has been extended. Preferably, probe 44 comprises a small diameter hollow metallic rod 50 of great rigidity. Movably positioned inside hollow rod 50 is a much smaller diameter metallic rod 51. Outer rod 50 is moved vertically by an adhesive rotary member 52 driven by smaller adhesive gear 53 which in turn is driven by a reversible electric motor 54. The vertical movement of outer rod 50 is restrained and guided by additional rotary members 55. Secured to the top of outer rod 50 is a limit switch 56. The probe 44 is lowered to the point where interior rod 51 contacts some component or the surface of the table. As outer rod 50 continues to lower, interior rod 51 moves upwardly inside outer rod 50 and engages limit switch 56. Activation of limit switch 56 electrically causes motor 54 to be disengaged and the downward motion of probe 44 is halted. The number of revolutions of driving gear 54 can be caused to determine how far the probe moved from its known starting position. Interior rod 51 is spring-loaded to return to its original position within outer rod 50 when motor 51 is re-energized and outer rod 50 moves to its known starting position.

As previously described, gantry 19 is movable in preselected increments longitudinally along the length of table 16 and model scanning unit 21 is movable in preselected increments along horizontal element 20. Thus, by commencing at one extremity of the model and transversing the complete Y-axis (the axis parallel to horizontal element 20) for each increment of the X-axis (the axis parallel to the longitudinal length of table 16), a coordinate grid of measured points can be generated as accurately as the positioning increments of the model scanner 10 allow. Additionally, gantry 19 and model scanning unit 21 may be moved responsive to affirmative commands to any selected position above table 16 for a special measurement.

Figure 4:
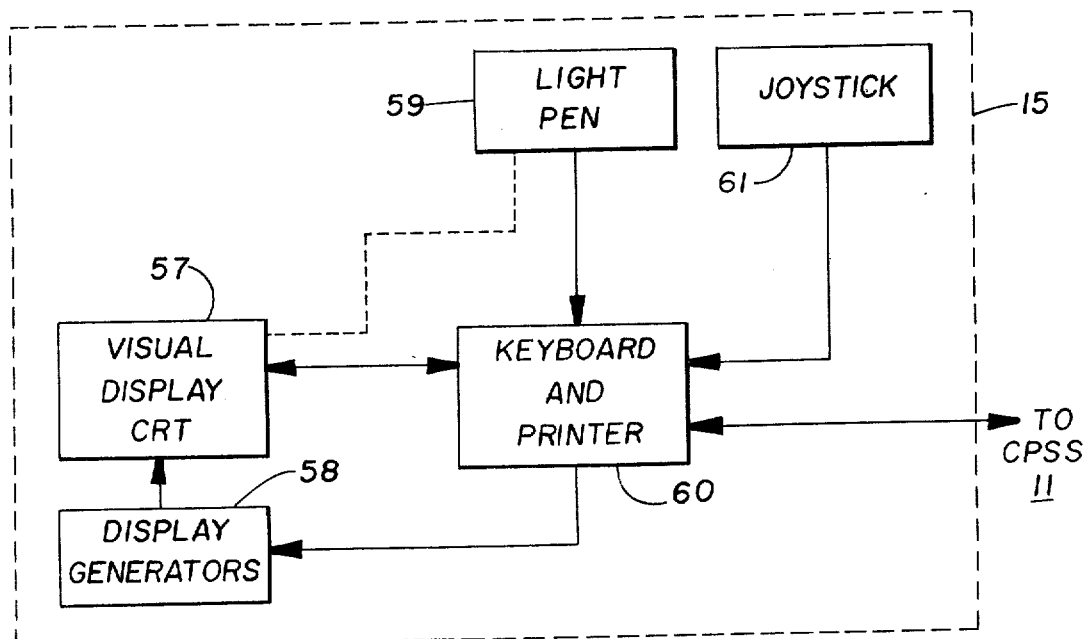
FIG. 4 illustrates in block diagram the preferred interactive graphics control console according to this invention.

The functional representation of the preferred interactive graphics control console (IGCC) 15 according to this invention is illustrated in FIG. 4. IGCC 15 preferably consists primarily of three functional elements: display devices, communications links with the CPSS 11, and human interference mechanisms.

The display portion of the console preferably consists of a refresh type cathode ray tube device 57 which is refreshed from a buffer control and loaded by CPSS 11. This display device is commercially available and is well known to those skilled in the art, such as an Adage Graphics Terminal manufactured by Adage, Inc. The CRT display device 57 preferably has a variable density determined by each type of application. A bank of display generators 58 for the CRT display device 57 preferably includes a stroke generator, used for creating the vectors for linear functions, a curve generator, used for efficient plotting of curved graphics, and a character generator, used to produce automatically on the CRT face the alphabetic characters and a number of special symbols in order to allow for annotation of the model image, both from CPSS 11 and directly by the operator. These display generators 58 are commercially available devices well known to those skilled in the art, such as the generators incorporated in the previously mentioned Adage Graphics Terminal.

The basic human interface components of the system preferably include a light pen 59 to mark specific locations on the face of the cathode ray tube allowing for designation of a particular component of the model image or for selection of a certain element from a list of tables displayed on the face of the cathode ray tube. The light pen 59 is a commercially available device well known to those skilled in the art, such as the light pen provided with the above described Adage Graphics Terminal.

A keyboard and printer device 60 is provided. Keyboard and printer 60 contains the alphanumeric and special character keys which allow the operator to input information directly to the system in a concise form. Additionally, keyboard and printer 60 contains function keys for direct communication with the other elements of the system through CPSS 11. For instance, operator commands supplied through keyboard 60 can direct the gantry 19 and the scanning unit 21 to be moved to a particular position over the working model and the probe 44 lowered to determine the Z dimension of that particular point of the model. The X, Y and Z coordinates of that point can then be displayed by CRT device 57 responsive to commands communicated to the system through the keyboard 60. The printer in keyboard and printer device 60 functions as an auxiliary means for communicating with the human operator. It preferably is not an extremely high-speed output printer, but rather a standard typewriter printer such as is provided with the Adage Graphics Terminal.

A "joy stick" control preferably is provided to signal translation and rotation of the image displayed on the CRT visual display device 57. This feature allows the computer model to be viewed visually in various perspectives. Joy stick control 61 preferably is a commercially available device well known to those skilled in the art, such as is provided with the Adage Graphics Terminal.

Referring again to FIG. 1, data scanner 14 is an apparatus which functions to scan, optically or electronically, two-dimensional data in the form of printed matter or drawings and generate responsive thereto electrical signals suitable for use in a general purpose digital computer. An apparatus which accomplishes this data scanning function is the Automatic Chart Reader described in U.S. Pat. No. 3,052,800. Use of the data scanner 14 allows the known characteristics of the various components of the proposed structure and the known specifications, if any, for the relationship of the components, to be transformed rapidly into a format acceptable to CPSS 11 and the external data banks 12; the time consuming method of "punching" the information into cards or writing a special computer program to define mathematically the image of a complex component of the proposed structure is obviated.

The external data banks 12 preferably consist of well known magnetic storage components, such as disc, drum and tape devices. The external data banks 12 function as the primary storage facility for the data accumulated by the system. Substantially all of the data supplied to the system through the data scanner 14, model scanner 10, ICCC 15 or otherwise, is processed through CPSS 11 to the external data banks 12. As is well known to those skilled in the art, the data is stored in the external data banks 12 until preselected portions of the data are recalled and processed in the memory component of CPSS 11.

The correlating, processing and storage system (CPSS) 11 preferably comprises a set of components for operating on and processing the data supplied to it in electrical format by the model scanning unit 10, the data scanner 14, the interactive graphics control console 15 and the external data banks 12. CPSS 11 consists of stored program processors, input/output components and memory units for performing the master control functions in the logic and computation as well as information storage and retrieval.

In the processor portion of CPSS 11, sets of instructions are provided which allow for the processing of the information and control signals from all points of interface. The method of providing such instructions to a precessor is well known to those skilled in the art. The memory portion of CPSS 11 preferably consists of directly addressible (executable) memories, augmented by sets of disk storage units in the external data banks 12, for the storage of the image information and the product data base used in processing the graphic information. In the input/output portion of CPSS 11, a magnetic tape or magnetic disk unit preferably is utilized to provide removable and loadable data bases for analysis and development of engineering drawings based on the mathematical facsimile model and other data base parameters. The input/output components of CPSS 11 also include the logical elements used in the control of the other functional elements interfaced with the CPSS unit. For instance, the interface with the model scanning unit 10 provides outputs for contolling the functions of the scanner, including the scanner positioning coordinates, motion vector components for movement of the scanning device, and the time block information for velocity control. Additionally, the input/output components of CPSS 11 control the probe 44 for elevation measurement pursuant to the commands of the operator.

It is preferable that the main program controlling CPSS 11 provide for the scheduling of resource requests within the CPSS, including processors, input/output components and memory units. As is well known in the art, the master control program should utilize the capabilities of CPSS 11 for buffered input/output and parallel interrupt logic to provide for simultaneous operation of the system resources. The memory scheduling algorithm preferably utilizes paging logic for memory management in order to effect efficient data and instruction transfer between the executable memory unit and the other elements of the memory input/output components.

In order to decrease the complexity of the computer programs, it is preferable that much of the data input to CPSS 11 be stored in the external data banks 12 as an "image" of the data rather than a mathematical model. The image may be stored on a magnetic disc, drum or tape as the presence or absence of pulses, each pulse being stored on the magnetic medium in a preselected location relating to the styli positions on the output printer. Thus, the magnetic medium functions as a "print buffer" for the output printer.

Interfacing with CPSS 11 is an output drawing and printout unit 13. This apparatus functions to draw and print in two-dimensional format the data comprising the computer facsimile model. This unit is well known to those skilled in the art. The drawing and print-out unit may be a Model 62 Automatic Drum Plotter manufactured by the Gerber Scientific Instrument 62 or a Videojet 9500 manufactured by A. B. Dick.

In the preferred operation of the improved system for designing structures according to this invention, the reflective surface 17 of table 16 is a full mirror. Each component comprising the working model is constructed so its surfaces are light reflective. A preferred method for providing this reflective surface is to coat the surface with impregnated glass beads hemispherically reflectorized with a metallic coating. The reflectorized components are mounted on or above the mirrored surface 17 of the table 16. Attached to the upper surface of each component, preferably at three separate locations, are physical positioning points. The positioning points have distinctive reflectivity characteristics, and, as such, function conjunctively to identify the position of each component. One type of preferred physical positioning point is a small adhesive disk which, rather than reflecting light directly back to the source, does not reflect light at all or reflects the light to some point other than the source.

The operator, communicating with CPSS 11 through IGCC 15, causes model scanner 10 to scan the working model responsive to electrical signals from CPSS 11 in accordance with a preselected scanning program. The scanning unit 21 and the gantry 19 preferably commence at one extremity of the working model and traverse the complete Y-axis of the working model for each increment of the X-axis. The working model is thus incrementally scanned from above at points corresponding to the print positions on the stylus drawing device 13.

At each point reached by the gantry scanning device, it is preferable initially to employ the light-measuring system of scanning unit 21 with the amplitude modulator 33 being inhibited to produce a light output of constant amplitude. If the collimated light emitted from this system is reflected from a portion of the surface of the component or of the table which is of constant elevation, there will be no fringes illuminated on photo-detector 40. The elevation of this point of the reflective surface can be determined either by lowering probe 44 or activating amplitude modulator 33 and timing the reflected pulse of light with the optical-timing system of scanning unit 21. Since the gantry/scanning unit preferably commences operation at one extremity of the-working the working probably the elevation determination at the initial point will reveal that the scanning unit is reflecting light from the surface 17 of table 16.

The gantry/scanning unit continues to move incrementally above the model while employing the light-measuring system of scanning unit 21. The photodetector 40 will detect no fringes except when the collimated light is reflected from a sloping surface. Whenever fringes are detected, however, the light-measuring system will function to count the fringes and, from the known wavelength of the light, determine the elevational difference between such point and the last point from which the collimated light was reflected. Data will be transmitted to CPSS 11 evidencing that, at a particular location along the X- and Y-axes, the Z-component changed a particular magnitude. The probe 44 or optical-timing portion of the scanning unit 21 may be employed at preselected intervals throughout the scanning operation to provide a check on the elevation of the reflective surface. Selective control of model scanner 10 thru CPSS 11 with an algorithm will permit the scanning to be performed individually along either the X- or Y-axis or a defined combination of the X-Y axes, thus collecting data on the Z-elevation along the defined plane. A different algorithm would permit the collection of data representing the X-Y co-ordinates for a defined Z-elevation.

Since each physical positioning point preferably has the unique characteristic of not reflecting light directly back to the source, the light-measuring system easily generates data which clearly indicates the location of each physical positioning point.

The scanning program processing the data in CPSS 11 during the scanning operation preferably directs CPSS to ignore elevation changes less than a preselected absolute magnitude. Thus, extremely slight changes in elevation are not recorded. But all of the other elevational transistions are recorded and thus provide the data from which the horizontal outline of the working model can be assembled in CPSS.

By determining with the light-measuring system the elevational differences between three or more distinct and non-colinear points in the same plane on the surface of a component, the radius of curvature of the surface can be determined. Determining the elevational differences between five distinct and non-colinear points in the same plane allows the determination of a conic section. This determined radius of curvature or conic section may function as an identifying characteristic of the component.

With respect to designing a chemical processing plant, selective control of model scanner 10 thru CPSS 11 with the appropriate algorithm and conjunctive use of the light-measuring system and the optical-timing system permits the scanning and tracking of the position of a single, preselected pipeline. For example, having determined that the signal beam is reflecting from the highest elevation of the pipeline surface, the scanning unit may commence tracking from side to side in a preselected direction along the longitudinal length of the pipeline. Whenever the signal beam commences to stray too far from the highest elevation of the pipeline, the light-measuring system will generate the fringes as previously described. CPSS 11 will then generate the necessary signals to cause the scanning unit to move the signal beam back toward the highest elevation of the pipeline. Periodic elevational determinations by the optical-timing system are utilized to verify the positions of the pipeline.

Figure 5:
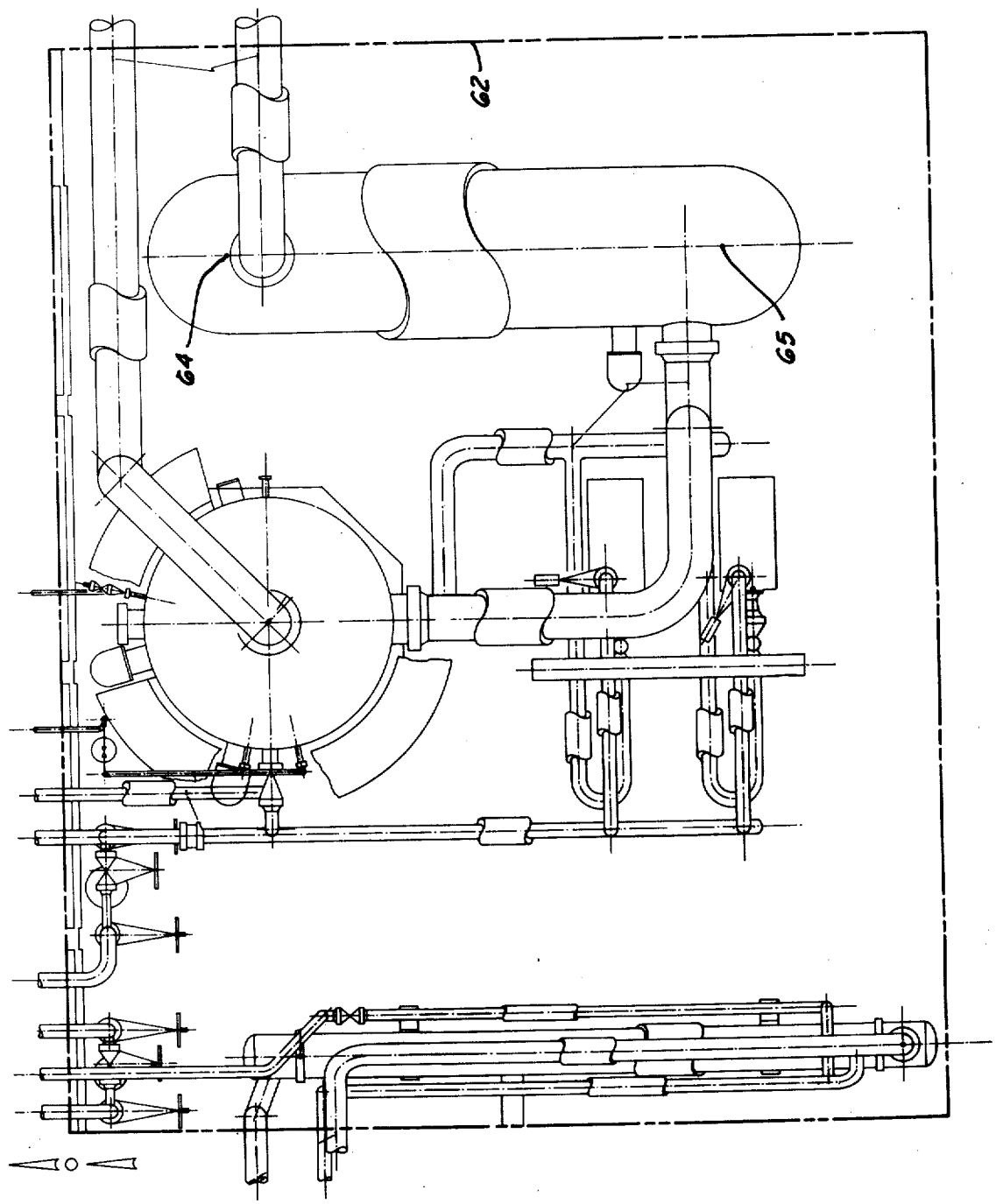
FIG. 5 illustrates typical two-dimensional images produced by data comprising the computer symbolic model according to a preferred embodiment of this invention.

The scanning program operating the components of CPSS 11 processes the data received from model scanner 10 to develop a computer symbolic model of the working model. The data comprising this computer symbolic model is sufficient to generate a visual plan view of the working model, complete with grid coordinates and elevations. This image may be displayed on the CRT display 57 of IGCC 15 or drawn by drawing device 13. A typical CRT display of the computer symbolic model is shown in FIG. 5. The operator may have requested CPSS 11 through IGCC 15 to display in plan view the data comprising the portion of the computer symbolic model contained with the quadrant defined by the dashed line 62. The outline of the components preferably has a grid (not shown) superimposed thereon to facilitate visual determination of the X-and Y-dimensions. The location of the physical positioning points will be shown. Additionally, all elevational dimensions determined by the probe 44 or opticaltiming system of scanning unit 21 will be shown. In FIG. 5, only a few of the many physical positioning points and elevation points are referenced. Two of the physical positioning points 64 and 65 are particularly pointed out for reasons that will hereinafter be explained. By viewing the image of the computer symbolic model projected on the CRT display device 57 of IGCC 15, the operator of the system is able to validate the representation of scanning operation and determine areas in which blind spots are occuring.

Figure 6:
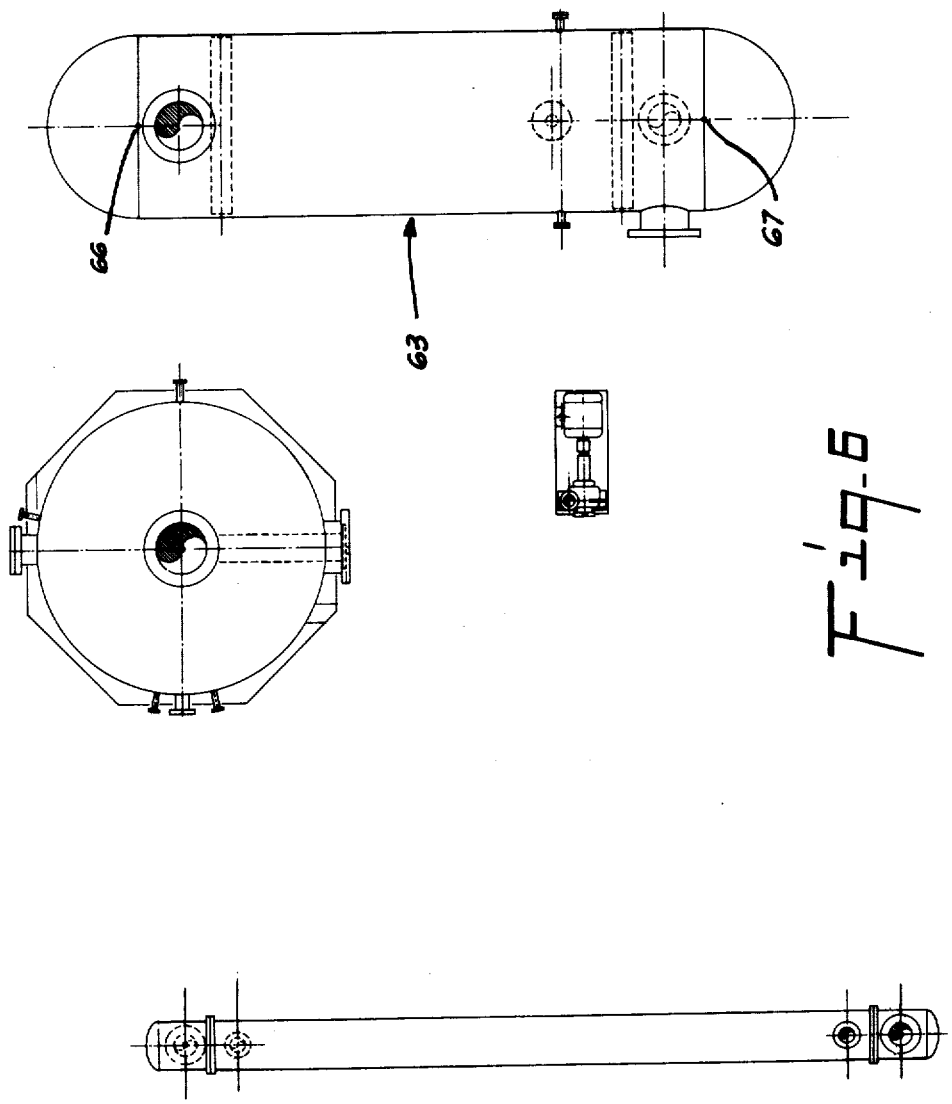
FIG. 6 illustrates the plan views of typical manufacturer drawings.

Contemporaneously with the operation of scanning the working model, data bases may be established involving known data on the characteristics of the various components of the proposed structure and all of the known specifications for the relationship of the components. This information is input to CPSS by means well known to those skilled in the art, such as by punch cards, through magnetic storage media, through data scanner 14, or through the keyboard of IGCC 15. These data bases include the characteristics of the process systems, such as process design calculations for heat exchangers and other equipment. They also include pertinent drafting design information. The data bases preferably include standard sizings of components, such as standards for pipe fittings and flange sizes, tables of standard valve sizes, standard piping configurations particular to the process design, linespecifications, types of insulation, and spacing conventions of the pipes on the pipe rack. Additionally, the data bases preferably include certified dimensional drawings of equipment purchased from manufacturers. The physical geometric characteristics of the equipment may be converted to parametric computer-readable input data for interpretation in the computer symbolic model, or may be stored as an actual geometric image of the equipment. In either case, each component is assigned mathematical "positioning points" or reference coordinates corresponding to the physical positioning points on the component of the working model representative thereof. All of the data supplied to CPSS 11 from the various sources preferably is processed through CPSS and stored in the peripheral external data banks 12 in a preselected format so it is immediately again available to the program algorithms in CPSS. FIG. 6 illustrates s typical manufacturer's print on a horizontal vessel 63. The plan view of the vessel is assigned the reference coordinates 66 and 67. All of the data comprising this manufacturer's drawing is input into CPSS 11 as previously described.

The operator may, by entering directions through the keyboard of IGCC 15, cause CPSS 11, operating responsive to preselected sets of programs, to substitute the certified manufacturer's drawings for selected images of the components defined by the model scanner 10. CPSS 11, of course, is programmed to enlarge or diminish properly the scale of the certified manufacturer's drawings to correspond with the scale of the image of the computer symbolic model. The operator, interfacing with CPSS 11 through IGCC 15, can view on the CRT 57 all or selected portions of the computer symbolic model with the manufacturer's drawings substituted thereon. If desired, an overlay of faintly scribed grid lines may be imposed on the tube face of the CRT or on the drawings produced by drawing device 13. By use of the keyboard and the light pen components of IGCC 15, the operator can request specific information relative to the computer symbolic model. These requests can include checking pipeline spacing on a pipe rack or other close areas, checking pipeline sizes, checking exact locations of fittings and nozzles relative to centerlines, and other dimensional information. If substitution of the manufacturer's dimensions and drawings for the images outlined by model scanner 10 causes overlap with other components or produces a situation which conflicts with a known specification for the relationship of the component, an error warning and the necessary instructions will be communicated to the operator through the keyboard and printer 60.

The operator may alter and further design the computer symbolic model to convert it into the computer facsimile model of the proposed structure. By means of the keyboard and light pen components of IGCC 15, the operator can make alterations to the symbolic model. The operator can also add co-ordinates, elevations or dimensions as well as descriptive information to various views of the symbolic model, such as insulation thicknesses, pipeline temperatures, wall thicknesses, and the like. The symbolic model may be altered by changing portions of the data bases and processing this altered data with data comprising the computer symbolic model.

The operator has the capability of relocating components of the computer symbolic model of the proposed structure. This may be accomplished by physically rearranging the components on the working model and rescanning the working model. It may also be accomplished by inputting the necessary information to CPSS 11 through the keyborad or light pen components of IGCC 15. Preselected sets of programs are input into CPSS 11 to provide for alterations to all of the other related components of the computer symbolic model responsive to the changed component. For instance, straight lines of pipe will move with the relocated equipment. In the cases where illogical alignments and overlapping components result, an error message will be printed on the keyboard and printer 60 of IGCC 15.

Figure 7:
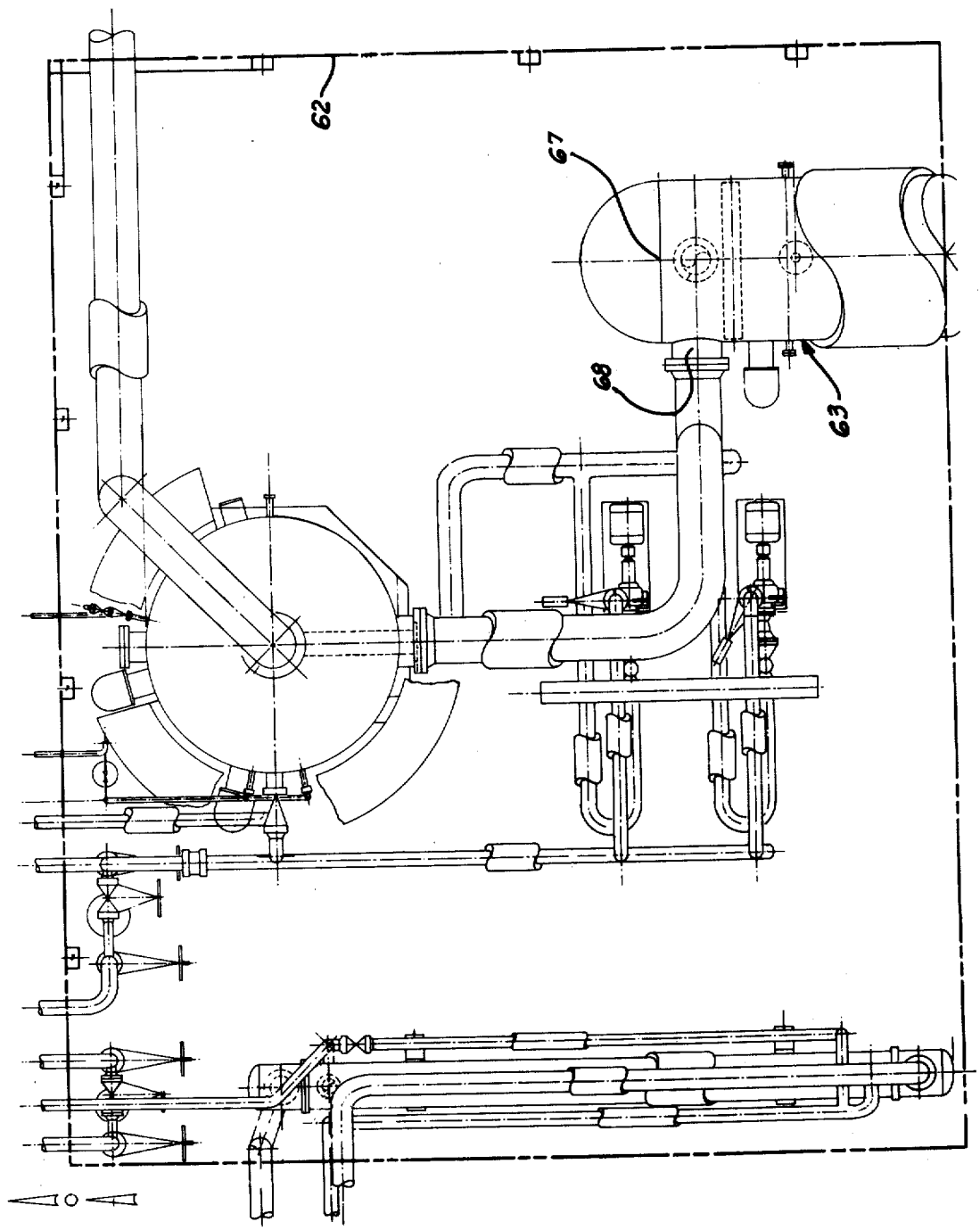
FIG. 7 illustrates typical two-dimensional images produced by data comprising the computer symbolic model displayed in FIG. 5 with certain of the data comprising the manufacturer's drawing displayed in FIG. 6 substituted therein.

An example of the computer symbolic model with the manufacturer's drawings substituted therein and certain alternations made in the arrangement of the components is illustrated in FIG. 7. For example, the manufacturer's data on the horizontal vessel 63 has been substituted for the data generated by model scanner 10. In the original substitution of data, reference coordinates 66 and 67 of the manufacturer's plan view would have been aligned with positioning points 64 and 65 (FIG. 5) of the computer symbolic model. FIG. 7, however, illustrates the horizontal vessel 63 flipped 180° about the axis of nozzle 68. Input nozzle 68 still enters horizontal vessel 63 adjacent reference coordinate 67. However, the other end of the vessel has been moved and must carry with it the output pipe.

FIG. 8 illustrates a typical CRT display or printout of the data comprising a portion of the computer facsimile model. The operator may have requested CPSS 11 through IRCC 15 to display in plan view the data compressing the portion of the computer facsimile model contained within the same quadrant 62 illustrated in FIGS. 5 and 7. All of the data formerly contained in the portion of the computer symbolic model illustrated in FIG. 7 is shown. Additionally, the portion of the computer symbolic model vacated by horizontal vessel 63 being flipped 180° about the axis of nozzle 68 is filled with a new vessel 73 and its attendant components. Moreover, data from the external data banks 12 has been added to the components to provide the dimensions necessary for the workmen to construct and position the various components. FIG. 8 illustrates a portion of the final design drawings which would be produced by the improved apparatus for designing structures according to this invention.

Thus, the improved apparatus for designing structures according to this invention provides the very substantial advantage that the operator can enter specific instructions relative to the effects of component relocation or changes and these modifications will be immediately implemented and displayed for study. In case a specific location or area of the model need by examined more closely, controls from the keyboard and light pen components of IGCC 15 will cause CPSS 11 to reproduce the preselected area at a preselected scale.

At any time during this operation, the operator can request via a sequence of control statements an analysis of the geometry of the computer symbolic model to determine suspected errors in the pipe and equipment configuration. Data from the external data banks 12 are processed through CPSS 11 and displayed for the operator. The computer facsimile model will include the results of all of the preceding evolutions of information and preferably will include dimensioning information on the graphic representation of the computer facsimile model. As the computer facsimile model evolves, it preferably is recorded on removable computer storage media so that it can be permanently stored and subsequently recalled for use in the CPSS 11.

At any time in the process of converting the computer symbolic model to the computer facsimile model, the information comprising the computer models may be output in the form of drawings or printed specifications. As preveiously described, a typical print-out of one form of the computer facsimile model is illustrated in FIG. 8. The drawings and specifications will include the latest revisions and will be significantly useful to the operator. Of course, the final drawings and specifications will be used by the construction personnel in constructing the structure.

All or portions of the finally designed computer facsimile model of the proposed structure may also be compared against a standard model to determine if the designed computer facsimile model meets requirements inplicit in the standard model. This comparision may be accomplished in any of numerous ways well known to those skilled in the art.

One example of the improved efficiency and decreased expense involved in designing structures with the apparatus and method according to this invention is provided in the FIG. 9 functional representation of the steps involved in designing piping configurations as currently practiced in the art according to the first method discussed. Currently, the first step in designing piping is to produce the equipment outlines from preliminary equipment drawings utilizing single-line piping layouts and equipment arrangement drawings to locate the equipment outlines. In the method and apparatus according to this invention, this step is replaced by the scan of the working model which produces a plan view outline of the model complete with physical positioning points, piping components, grid coordinates and elevations; the working model itself replaces the single-line piping layouts and equipment arrangement drawings.

Currently, the second step is to laboriously draft the piping drawings, including all dimensions and descriptive information. This step is replaced in the method and apparatus according to this invention by substituting, in the manner heretofore explained, the data comprising the manufacturer's certified drawings and specifications on the piping and other components for selected portions of the computer symbolic model. The operator may utilize the apparatus according to this invention to realign or correct the various piping configurations and components of the symbolic model, adding such descriptive information as may be required.

The fourth step in the current method is to check the piping drawings. This currently entails checking all aspects of the drawing, including the certified manufacturer's drawing on equipment, dimensions and piping standards, such as pipe clearances and the like. After being checked, the piping drawings are corrected (step 5), customer approval is obtained and the piping drawings are transmitted to the construction group to assist in the physical erection of the pipe spools. Concurrently with obtaining customer approval, the piping spool sheets (step 6) are made. Subsequently to customer approval of the piping drawings, the spool sheets are checked (step 7). These spool sheets are transmitted to the construction group for fabrication of the pipe spools. A listing of the final piping material for purchasing (step eight) concludes the engineering requirements for the fabrication and erection of the piping components.

In the method and apparatus according to this invention, steps four through eight are accomplished concurrently with checking pipe spool drawings (step seven). It should be remembered that prior to the operator checking the drawings, the symbolic model has been altered to include the manufacturer's certified drawings with dimensions and ratings of piping connections to the equipment and the plant co-ordinates for the equipment. In addition, the symbolic model has been altered to include the outline of the corrected piping configurations.

The operator utilizes the apparatus according to this invention to convert the piping configuration of the symbolic model to the facsimile model. By means of the keyboard and light pen components of IGCC 15 and preselected programs, the operator may cause a single pipeline from the symbolic model to be illustrated on the CRT display device. The scanned piping co-ordinates and elevations are corrected by the operator to conform with the manufacturer's certified dimensions.

Dimensioning the isometric view of the pipeline is accomplished using data bank tables containing standard pipe fitting sizes and dimensions, flange sizes and dimensions for each rating, and valve sizes and dimensions for each type and rating. Tag numbers are assigned for identification of in-line instruments or other specialty items. In addition to the information mentioned above, these tables preferably contain an outline configuration for each of the piping components. Other components for assembling the pipe, such as bolts and gaskets, are also included. Also used in dimensioning the isometric view are the line specifications, which include information pertaining to the line number, size, description, line origin and termination, line design basis, operating and test conditions, material, painting and insulation. These tables are used in conjunction with other pipe design data, such as offset pipe bends, or mathematical tables, such as trigonometry funq ions, to dimension correctly a pipeline.

The operator may identify the pipeline by line number to access the specifications for that pipeline. With the keyboard and light pen the operator may identify each component of the line, including valves and instruments, by tag number. Preselected algorithms convert the symbolic view to a facsimile view by use of the component outlines. Similar preselected algorithms dimension the facsimile view, list material by specification for purchasing, and print the dimensioned isometric view for fabrication. The step of calculating pipe stresses is performed by a preselected program utilizing the dimensions and configuration of the pipeline as shown in the isometric view. This function may be performed at the option of the operator or triggered by predetermined factors. Other algorithms may be used to replace the symbolic line with the facsimile line in the symbolic model. After completion of this phase, the symbolic model has been converted to a facsimile model. Additional information, such as dimensioning between pipelines, may be performed on the facsimile model by the operator using the keyboard and light pen.

An algorithm preferably is provided that differentiates between the symbolic model as scanned or corrected and the facsimile model as determined from certified manufacturer's drawings and dimensioned pipe configurations. This algorithm performs to print an error message when conflicts in engineering data within the facsimile model are detected.

The discussion relating to utilizing the method and apparatus according to this invention to increase the efficiency and decrease the cost of designing piping configurations for an industrial chemical plant is of course merely exemplary of the use of this invention to aid in designing the entire plant. Similar savings can be obtained in other aspects of the overall design, such as the design of vessels, location drawings for foundations, structural drawings, and instrumentation and electrical drawings.

Figure 10:
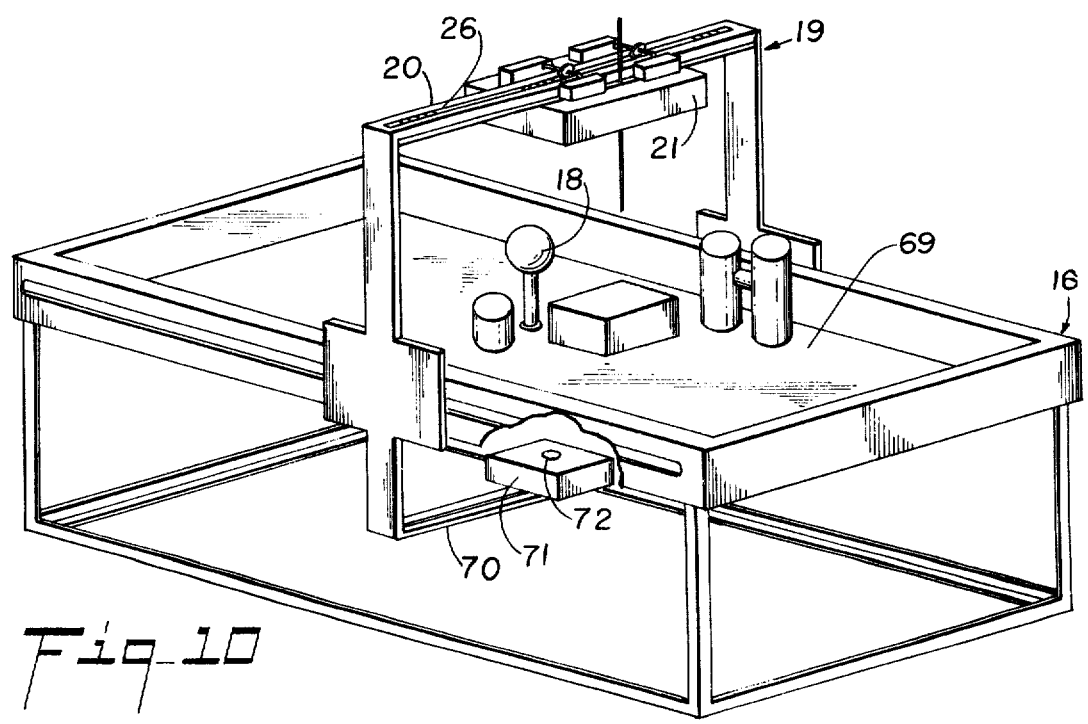
FIG. 10 is an alternate model scanner according to this invention.

FIG. 10 illustrates an alternate apparatus for determining the geometric shapes and relationships of the various components comprising the working model. Table 16 of the alternate apparatus is constructed as previously described with resepct to the embodiment of this invention illustrated in FIGS. 1 through 9, except the surface of the table is not a mirror. Rather, the entire horizontal portion 69 of the table, upon which rests the working model, is constructed of a transparent material, such as glass. Model scanning unit 21 moves along horizontal element 20 of gantry 19 as previously described. However, portions of the equipment mounted in container 22 of model scanning unit 21 as described with respect to the embodiment illustrated in FIGS. 1 through 9 have been omitted. In this embodiment of the invention, container 22 contains only the probe 44 with its attendant mechanism, and laser source 32 (all of which has been shown and described in FIG. 3). The remaining components comprising the light-measuring system and the optical-timing system of FIG. 3 have been omitted.

Additionally, gantry 19 is constructed with a pair of downwardly extending arms supporting a lower horizontal element 70 below the transparent surface 69 of the table. Lower horizontal element 70 is at all times parallel to and in a vertical plane with horizontal element 20. Moveable secured to lower horizontal element 70 is a manner similar to that previously described with respect to model scanning unit 21 is a photocell support unit 71. Mounted on support unit 71 is a photocell 72. Photocell 72 is positioned perpendicularly below the laser source 32 contained in scanning unit 21. Support unit 71 and scanning unit 21 are moved laterally conjunctively along horizontal elements 20 and 70 so that photocell 72 at all times remains perpendicularly below laser source 32.

In operation, gantry 19 and model scanning unit 21 move incrementally above the working model as described with respect to the embodiment of this invention illustrated in FIGS. 1 through 9. Support member 71 moves along lower horizontal element 70 so that photocell 72 tracks the movement of laser source 32. At preselected incremental locations throughout the path of the laser photocell, laser source 32 directs a beam of light downward toward photocell 72. Data in the form of electrical signals are generated by photocell 70 depending upon whether there is a component of the working model present at each such incremental location to interrupt the beam of light. Additionally, at preselected locations, probe 44 is utilized to determine the elevation of the top surface of the component. All of this data is transmitted to CPSS 11 in order that there may be produced a computer symbolic model of the working model.

Figure 11:
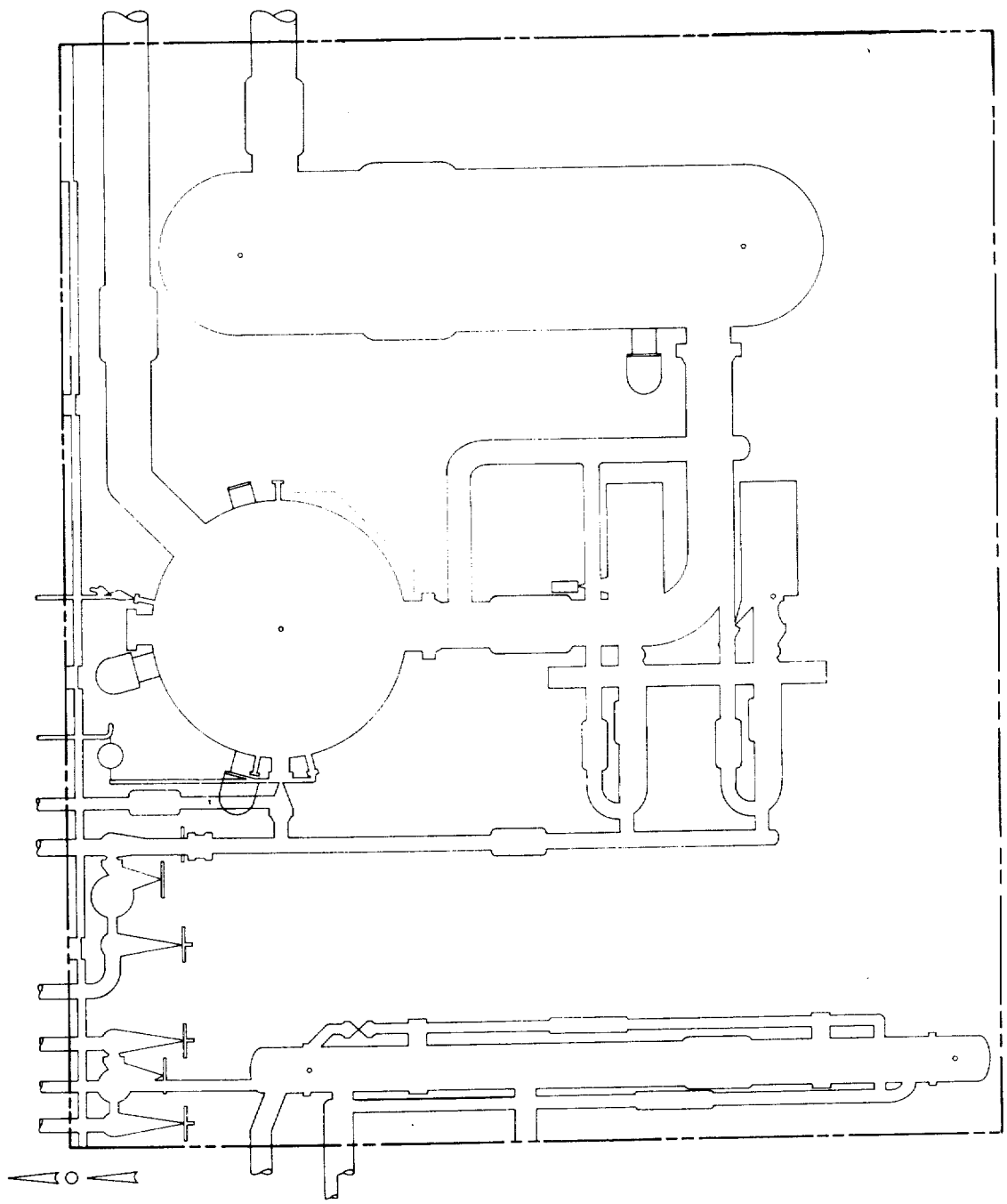
FIG. 11 illustrates typical two-dimensional images produced by data comprising the computer symbolic model obtained with the alternative model scanner unit illustrated in FIG. 10.

It is understood, of course, that this alternate method of determining the geometric shape and arrangement of the components of the working model does not allow for the optical determination of the physical positioning points on the working model. Additionally, it merely provides data revealing the gross outline of the working model as shown in FIG. 11; the data does not reveal the edge of a component which overlies a portion of another component.

Other apparatus for determining the geometric shapes and relationships of the various components comprising the working model may be utilized in the system according to this invention. For example, the working model may be constructed to have reflective surfaces and be mounted on a transparent supporting surface. In such an apparatus, the model scanning unit 21 described with respect to the embodiment illustrated in FIGS. 1 through 9 may be used conjunctively with the photocell device 72 described with respect to the embodiment illustrated in FIG. 10. Additionally, the working model may be constructed to have nonreflective surfaces but be mounted on a reflective supporting surface. In such an apparatus, the model scanning unit 21 can be as described in the embodiment illustrated in FIGS. 1 through 9. Using the light-measuring system, reflection of the signal beam 42 from the supporting surface will cause the Gaussian spot to materialize. Loss of the Gaussian spot will yield data evidencing the edge of a model component. The optical-timing system may be used to determine the location and elevation of physical positioning points constructed to reflect light directly back to the source. Additional elevation measurements can be made with the mechanical probe.

Moreover, the supporting surface for the working model may be nonreflective and the components of the working model may be constructed to be reflective. In such an apparatus, the model scanning unit 21 may be constructed as described with respect to the embodiment of this invention illustrated in FIGS. 1 through 9. The Gaussian spot of the light-measuring system will be illuminated only when the laser source is over a component of the working model, thus yielding data evidencing the outline of the working model. If the reflective surface of the model component is sloped, then fringes will be produced on the Gaussian spot. The mechanical probe and the optical-timing system can be used to determine the elevations of the model components. Physical positioning points may be used on the model components.

The various types of scanning apparatus defined above can "see" the top half of the working model. This plan view is normally adequate for the designing of a process chemical plant. In special or other applications of the apparatus, a need to simultaneous see both halves of the working model may be required. This need may be filled by substituting a unit identical to model scanning unit 21 for photocell 72 in the alternate apparatus shown in FIG. 10. By utilizing a reflective model surface with either a transparent base or some other independant means of model support together with selective control of the model scanner 10, a cross section view can be derived.

From the foregoing, it will be understood that the present invention provides an improved method and apparatus for designing structures. It will now be apparent to those skilled in the art that the foregoing disclosure an description of the invention are illustrative and explanatory thereof, and various changes may be made in the construction of the improved method and apparatus within the scope of the appended claims without departing from the spirit of the invention.

What is claimed is:

1. An apparatus for producing data indicative of the geometric shape and arrangement of the various components of an irregular shaped model, comprising:

a receiving means for supporting the model;
a scanning means; and
means for moving the scanning means through substantially all of a selected area of a plane, which plane is positioned in a selected spaced relationship with the receiving means supporting the model;
the scanning means including:
light modulation means for determining within a selected range of accuracy the distance between the scanning means and selected points on the surface of the model exposed to the scanning means as the scanning means through the selected area of the plane and for generating an electrical signal representative thereof. and
interferometer means for determining, within a selected magnitude of distance, changes in the distance between the scanning means and selected points on the surface of the model as the scanning means moves through the selected area of the plane and for generating an electrical signal representative thereof;
the light modulation means and the interferometer means coacting with the moving means to produce output data indicative of the surface of the model exposed to the scanning means in a three-dimensional coordinate system.

2. An appparatus for producing data indicative of the geometric shape and arrangement of the various components of an irregular shaped model, comprising:

a receiving means for supporting the model;
a container means;
means for moving the container means through substantially all of a selected area of a plane, which plane is positioned in a selected spaced relationship with the receiving means supporting the model;
a light source contained within the container means;
an observing plane secured within the container means and having a selected spaced relationship to the light source;
means secured within the container means for directing a signal beam of light from the light source in a preselected direction toward the model as the container means moves through the selected area of the plane and for directing a reference beam of light from the light source to the observing plane;
means secured within the container means for superimposing any portion of the signal beam reflected back from the model onto the reference beam directed onto the observing plane;
light sensitive means secured within the container means for determining the interference of such two beams of light on the observing plane and for generating an electrical signal responsive thereto which, within a selected magnitude of distance, is representative of changes in the distance between the container means and selected points on the surface of the model exposed to the container means as the container means moves through the selected area of the plane;
means mounted in the container means for modulating a selected parameter of the light from the light source so that a wave of light has a distinct identity; and
means mounted in the container means for determining the interval of time required for a distinct wave of light in the light beam to travel to a reflective portion of the surface of the model and to return to the observing plane and for generating an electrical signal which, within a selected range of accuracy, is representative of the distance between the scanning means and such reflective portion of the surface of the model exposed to the scanning means; the scanning means and the moving means coacting together to output data indicative of the surface of the model exposed to the scanning means in a three-dimensional coordinate system.

3. An apparatus for producing data indicative of the geometric shape and arrangement of the various components of an irregular shaped model, comprising:

a receiving means for supporting the model;

a scanning means;

means for moving the scanning means through substantially all of a selected area of a plane, which plane is positioned in a selected spaced relationship with the receiving means supporting the model;

the scanning means including:

an interferometer means for determining, within a selected magnitude of distance, changes in the distance between the scanning means and selected points on the surface of the model as the scanning means moves through the selected area of the plane and for generating an electrical signal representative thereof, an elongated, tubular mechanical probe mounted in the container means, means mounted in the container means for moving the probe in preselected directions along its longitudinal axis as the scanning means moves through the selected area of the plane, and mean for determining the distance the probe moves prior to contacting the model or the receiving means and for generating an electrical signal representaive thereof;

the interferometer means and the probe distance determining means coacting with the moving means to produce output data indicative of the surface of the model exposed to the scanning means in a three-dimensional coordinate system.

4. An apparatus for producing data indicative of the geometric shape and arrangement of the various components of an irregular-shaped model, comprising:

a transparent receiving means for supporting the model;

a container means;

a support unit;

means for conjunctively moving the support unit and the container means in a preselected spaced relationship with the model whereby the model is between first and second paralllel planes passing through the support units and the container means, respectively, the support unit and the container means being movable through substantially all of the selected areas of the respective parallel planes;

a light source contained within the container means for directing a beam of light toward the support unit as the container means and the support unit move through the selected areas of the planes;

a photoelectric cell mounted on the support unit for generating an electrical signal representative of each detection of the beam of light generated by the light source, the photoelectric cell being supported on the support unit and the light source being positioned in the container means and directed toward the support means such that the light from the light source energizes the photoelectric cell whenever the light is not interrupted by a portion of the model;

light modulation means contained within the container means for determining within a selected range of accuracy the distance between the container means and selected points on the surface of the model exposed to the container means as the container means moves through the selected area of the plane and for generating an electrical signal representative thereof;

the light modulation means and the photoelectric cell coacting with the means for moving the container means and the support means to produce output data indicative of the surface of the model exposed to the container means of a three-dimensional coordinate system.

5. In a system for aiding in the design of a structure, and apparatus for producing data indicative of the geometric shape and arrangement of the various components of a working model of the structure, comprising:

a table presenting a transparent supporting surface, the components of the working model being supported on the transparent surface;

a gantry extending both above and below the transparent surface of the table and being movable longitudinally along the length of the table;

a container means movably secured to the gantry for transverse movement of the table on one side of the supporting surface;

a photocell support movably secured to the gantry for transverse movement of the table on the other side of the transparent supporting surface conjunctively with transverse movement of the scanning means;

a photocell mounted on the photocell support means for generating an electrical signal representative of its detection of a selected beam of light;

a light source mounted in the container means for directing a beam of light toward the photocell so that the photocell is energized wherever movement of the gantry and the conjunctive movement of the photocell support means and the container means is such that no portion of the working model interrupts the light beam;

an elongated, tubular mechanical probe mounted in the container means;

means mounted in the container means for moving the probe in preselected directions along its longitudinal axis; and means for determining the distance the probe moves prior to contacting the model or the receiving means and for generating an electrical signal representative thereof;

the photocell and the probe distance determining means coacting with the means for moving the container means to produce output data indicative of the surface of the model exposed to the container means in a three-dimensional coordinate system.

6. In a system for aiding in the design of a structure, an apparatus for producing data indicative of the geometric shape and arrangement of the various components of a working model of the structure, comprising:

a receiving means for supporting the model;

a scanning means;

means for moving the scanning means through substantially all of a selected area of a plane, which plane is positioned in a selected spaced relationship with the receiving means supporting the model;

the scanning means including:

a light source for generating a beam of light toward the surface of the model exposed to the scanning means as the scanning beam moves through the selected area of the plane, means for modulating a selected parameter of the light from the light source so that a wave of light has a distinct identity, and means for determining the interval of time required for distinct wave of light in the light beam to travel to a reflective portion of the model and to return to the scanning means and for generating an electrical signal representative of the distance between the scanning means and such reflective portion of the model, an elongated, tubular mechanical probe mounted in the scanning means, means mounted in the scanning means for moving the probe in preselected directions along its longtudinal axis as the scanning means moves through the selected area of the plane, and means for determining the distance the probe moves prior to contacting the model or the receiving means and for generating an electrical signal representative thereof;

the means for generating an electrical signal representative of the interval of time required for the modulated light to be reflected to the scanning means and the probe distance detection means coacting with the moving means to produce output data indicative of the surface of the model exposed to the scanning means in a three-dimensional coordinate system.

* * * * *